United States Patent [19]

Makino

[11] Patent Number: 4,856,083

[45] Date of Patent: Aug. 8, 1989

[54] METHOD OF CONNECTING A CORDLESS TELEPHONE BY RADIO

[75] Inventor: Masayuki Makino, Tokyo, Japan

[73] Assignee: NEC Corporation, Tokyo, Japan

[21] Appl. No.: 220,147

[22] Filed: Jul. 18, 1988

[30] Foreign Application Priority Data

Jul. 16, 1987 [JP] Japan ................................. 62-178286

[51] Int. Cl.⁴ .............................................. H04Q 7/00
[52] U.S. Cl. ...................................... 455/166; 455/34; 379/61; 379/62
[58] Field of Search .................... 455/11, 33, 34, 68, 455/88, 89, 161, 166, 53, 54, 58, 57, 343; 379/59, 61, 62

[56] References Cited

U.S. PATENT DOCUMENTS

| | | | |
|---|---|---|---|
| 4,056,780 | 11/1977 | Faulkner | 455/11 |
| 4,284,848 | 8/1981 | Frost | 455/11 |
| 4,430,755 | 2/1984 | Nadir | 455/166 |
| 4,511,761 | 4/1985 | Yamazaki et al. | 455/89 |
| 4,672,657 | 6/1987 | Dershowitz | 455/34 |
| 4,679,225 | 7/1987 | Higashiyama | 379/61 |
| 4,689,812 | 8/1987 | Hata | 379/61 |
| 4,716,407 | 12/1987 | Borras et al. | 455/166 |
| 4,744,101 | 5/1988 | Saegusa | 379/61 |
| 4,768,219 | 8/1988 | Yamagata et al. | 379/61 |

Primary Examiner—Robert L. Griffin
Assistant Examiner—Curtis Kuntz
Attorney, Agent, or Firm—Sughrue, Mion, Zinn, Macpeak and Seas

[57] ABSTRACT

A method of connecting a cordless telephone by radio without using control channels selects priority radio channels from radio channels which are shared by cordless telephones and assigns each of them to a respective one of the cordless telephones. So long as the priority radio channel assigned to any of the telephones is not occupied by another telephone, that telephone uses it. A portable unit of the telephone is allowed to enter into a call origination flow in response to a call origination request only after confirming that an incoming calling signal is not being sent over the priority radio channel from a fixed unit which is associated with the portable unit. Even when a call origination request occurs before a radio connection for an incoming call, the fixed and portable units are prevented from tuning to different radio channels without the need for a control channel.

9 Claims, 7 Drawing Sheets

METHOD OF CONNECTING A CORDLESS TELEPHONE BY RADIO

BACKGROUND OF THE INVENTION

The present invention relates to a method of connecting a cordless telephone by radio, particularly a cordless telephone of the type not using a control channel.

A cordless telephone is constituted by a fixed unit and a portable unit which serve as a base station and a mobile station, respectively. The portable unit is connectable to the fixed unit over a radio link. Each of the two units includes a transmitter and a receiver which permit full duplex communications. To promote effective use of electromagnetic waves, a number of such cordless telephones share a plurality of radio channels. Each telephone searches for an idle radio channel and connects its fixed and portable units to each other over the idle radio channel. For this reason, the fixed and portable units are individually constructed to tune the transmit and receive frequency to any of the radio channels by a frequency synthesizer system. Each telephone is provided with a particular identification number (ID No.) so that the fixed and portable units may identify electromagnetic waves which are sent from each other.

The radio connection systems for cordless telephones may generally be classified into two types, i.e., a system using a control channel and a system not using a control channel.

In the control channel type connection system, a fixed and a portable unit each waits on a control channel. The fixed unit received an incoming call and the portable unit on which a call is originated send respectively a calling signal including the ID No. and channel information to be used and a call origination signal. Then, the fixed and portable units tune their transmit and receive frequencies to the same radio channel. The control channel is shared by the cordless telephones on a time-sharing basis.

On the other hand, the prior art connection system which does not use a control channel causes each of the fixed and portable units in a waiting condition to sequentially tune the transmit and receive frequency to radio channels to thereby cyclically monitor the radio channels available. The fixed unit received a call or the portable unit on which a call origination request has been entered fixes its transmit and receive frequency to one of idle radio channels and then sends a calling signal including the ID No. or a call origination signal over that channel. Since the other unit is cyclically monitoring the radio channels, that unit received the calling signal including the own station's ID No. or the call origination signal fixes the transmit and receive frequency to that radio channel. Thereafter, either a call reception flow or a call origination flow is executed over the particular radio channel. With the radio connection system without a control channel, it is possible to assign the entire radio frequency band available to the radio channels for communication and, hence, efficient use of electromagnetic waves is achievable.

However, the prior art radio connection system without a control channel has a problem left unsolved, as follows. Assume that when the fixed unit transmits a calling signal to the portable unit over a certain radio channel, the portable unit is brought into an off-hook condition before it receives the calling signal. Then, the portable unit decides that a call is to be originated and sends a call origination signal to the fixed unit over another radio channel. When the fixed and portable units are tuned to different radio channels as stated, not only the radio connection for the origination of a call but also the radio connection for the reception of a call are apt to fail.

SUMMARY OF THE INVENTION

It is therefore an object of the present invention to provide a radio connection method for a cordless telephone of the type not using a control channel which ensures a radio connection for an incoming call even when a call origination request occurs before the radio connection for an incoming call is completed.

It is another object of the present invention to provide a generally improved method of connecting a cordless telephone by radio.

A method of connecting by radio a cordless telephone having a base unit and a mobile unit, having a particular identification number, and sharing a plurality of radio channels with other cordless telephones without using control channels of the present invention comprises the steps of (a) selecting priority radio channels from the radio channels and assigning each of the priority radio channels to a respective one of the cordless telephones, (b) causing the base unit to monitor the priority radio channel assigned to the cordless telephone associated with the base unit when a calling signal is received, (c) if the priority radio channel is idle, causing the base unit to send the calling signal to the mobile unit over the priority radio channel, (d) causing the mobile unit to monitor the priority radio channel assigned to the cordless telephone when a call origination signal is to be sent, (e) causing the mobile unit to send an answer signal to the base unit when a calling signal meant for the cordless telephone is received over the priority radio channel, and (f) causing the mobile unit to send a call origination signal to the base unit over the priority radio channel only if a calling signal meant for the cordless telephone is not received over the prioriy radio channel and the priority radio channel is idle.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

One embodiment of the method in accordance with the present invention will be described in detail with reference to the accompanying drawings.

A cordless telephone in accordance with the present invention is constituted by a fixed unit and a protable unit which serve as a base station and a mobile station, respectively. The portable unit is connectable to the fixed unit by a radio link. The fixed unit is generally made up of a power supply section for supplying power of predetermined voltage and frequency, a transmitting and receiving section for permitting full duplex communications, and a logic circuit for controlling the entire unit. On the other hand, the portable unit is generally comprised of a power supply section powered by, for example, a nickel-cadmium (Ni-Cd) battery of predetermined voltage, an operating section including a dial key pad and function keys, a transmitting and receiving section, and a logic circuit adapted to control the entire unit. Specific constructions of the fixed unit and portable unit except for their power supply sections will be described with reference to FIGS. 1 and 2, respectively.

Figure 1:
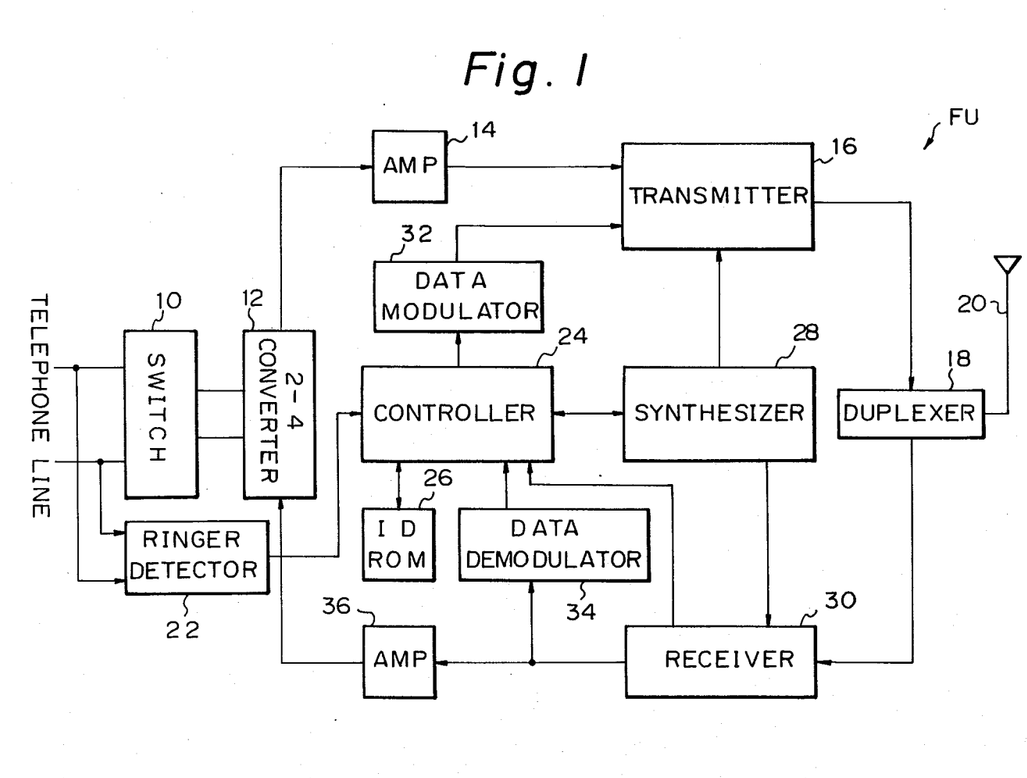
FIG. 1 is a schematic block diagram showing a fixed unit of a cordless telephone in accordance with the present invention.

Referring to FIG. 1, a fixed unit FU includes a switch 10 which is connected to a telephone line and a 2-4 converter 12. The 2-4 converter 12 is connected to a transmitter 16 via an amplifier 14 while the transmitter 16 is connected to an antenna 20 via a duplexer 18. A ringer detector 22 is also connected to the telephone line and to a controller or central processing unit (CPU) 24. Also connected to the controller 24 are an identification read-only memory (ID-ROM) 26 and a synthesizer 28. The synthesizer 28 is connected to the transmitter 16 and a receiver 30. A data modulator 32 is interposed between the controller 24 and the transmitter 16. The receiver 30 is connected to the antenna 20 by way of the duplexer 18. The receiver 30 is connected to the controller 24 directly and via a data demodulator 34. An amplifier 36 is installed between the receiver 30 and the 2-4 converter 12.

Figure 2:
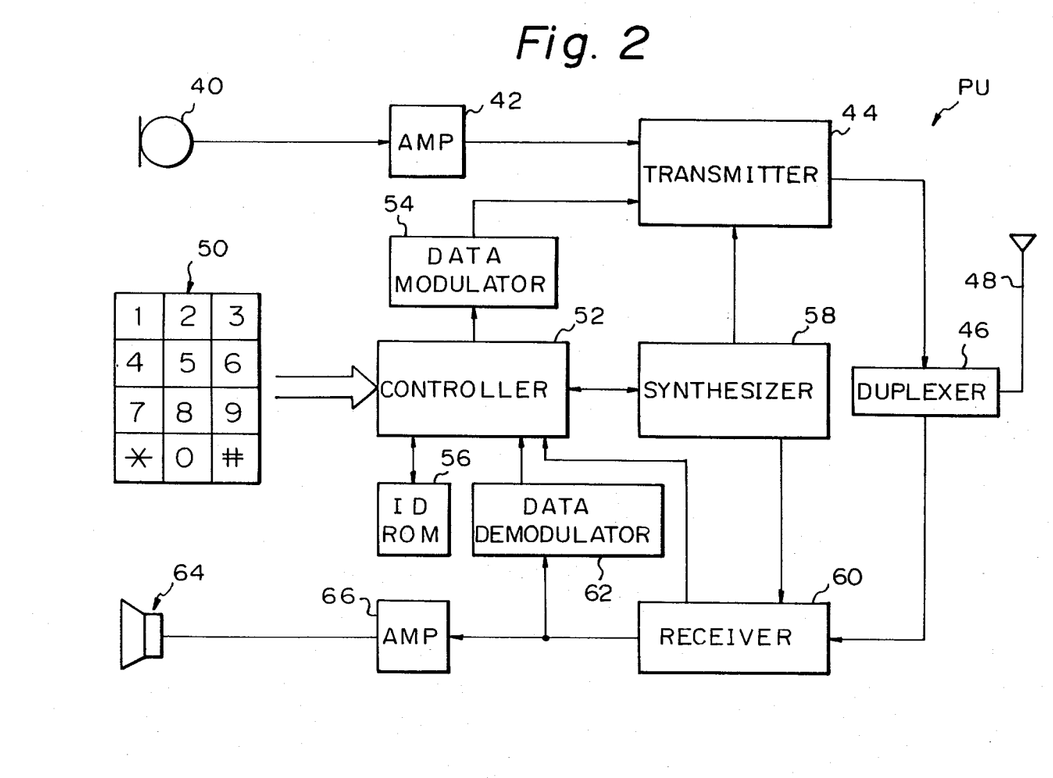
FIG. 2 is a schematic block diagram showing a portable unit which is associated with the fixed unit of FIG. 1.

As shown in FIG. 2, a portable unit PU includes a microphone 40 which is connected to a transmitter 44 via an amplifier 42. The transmitter 44 is connected to an antenna 48 via a duplexer 46. Key switches 50 are connected to a controller 52. A data modulator 54 is interposed between the controller 52 and the transmitter 44. Also connected to the controller 52 are an ID-ROM 56 and a synthesizer 58 which is connected to the transmitter 44 and a receiver 60. The receiver 60 is connected to the antenna 48 via the duplexer 46 and to the controller 52 directly and via a data demodulator 62. A loudspeaker 64 is connected to the receiver 60 via an amplifier 66.

Figure 3:
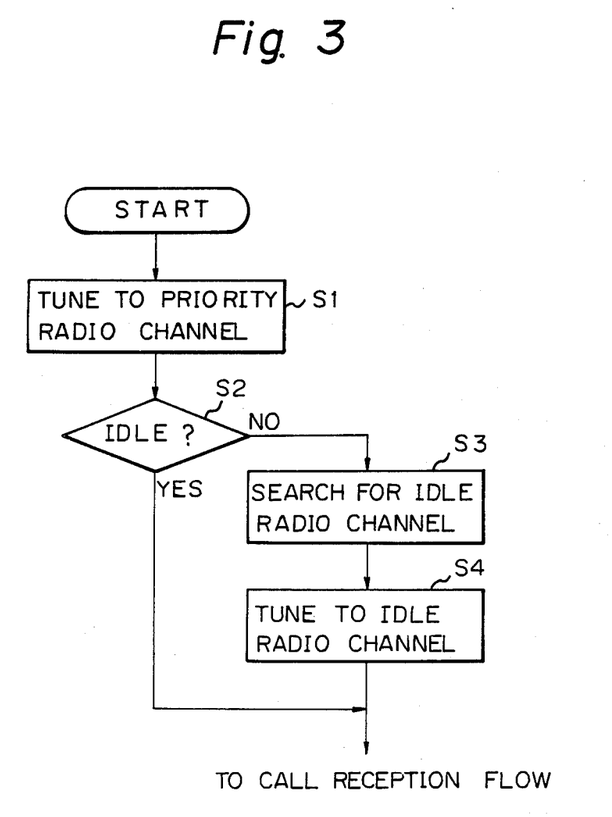
FIG. 3 is a flowchart demonstrating a specific procedure which occurs in response to an incoming call.
Figure 4:
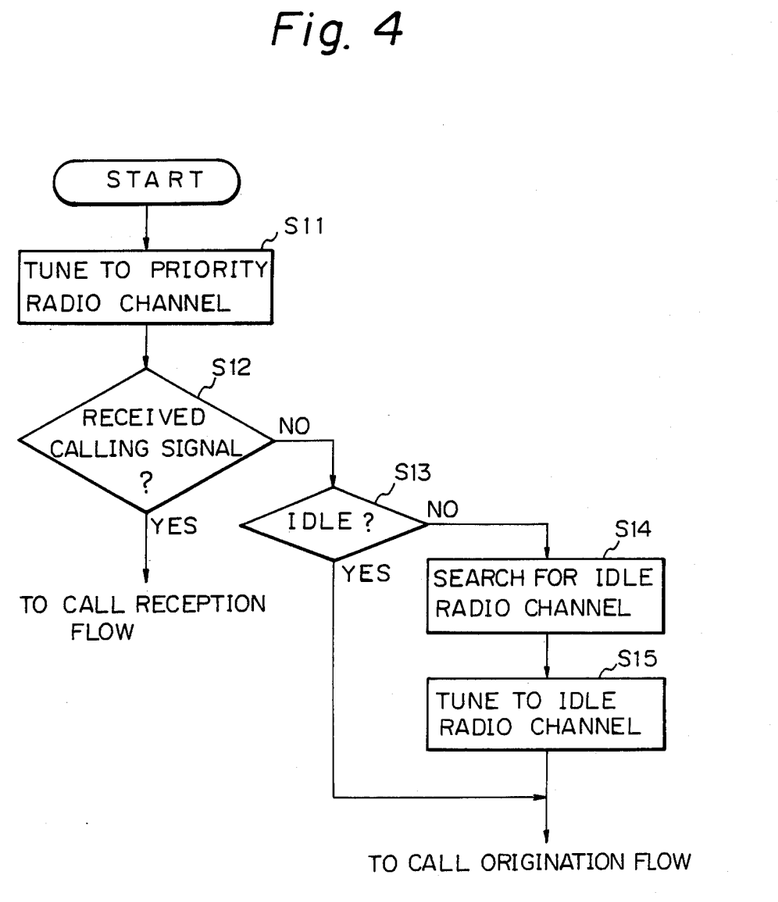
FIG. 4 is a flowchart demonstrating a specific procedure which occurs in response to a call origination request.

FIG. 3 is a flowchart demonstrating a specific operation of the fixed unit FU which occurs upon reception of a call. FIG. 4 is a flowchart representative of a specific operation of the portable unit PU which is performed for requesting the origination of a call.

Priority radio channels are selected from radio channels which are shared by independent cordless telephones and individually assigned to the cordless telephones. Assume that ID Nos. are serial and that serial numbers beginning with 0 (zero) are assigned to the individual radio channels. Then, the priority radio channels will be evenly assigned if each cordless telephone with a particular ID No. is provided with a priority radio channel having a number which corresponds to a residual produced by dividing the ID No. by the number of radio channels. In the case where serial numbers beginning with 1 (one) are assigned to the individual radio channels, the priority radio channel will be the radio channel having a number which corresponds to the sum of a residual produced by dividing the ID No. by the number of radio channels and 1. Assuming that forty radio channels are available and that the ID No. is represented by N, N is given by $40 \times A + B$ $(B=1, 2, 3, \ldots, 39)$. In this case, the priority radio channel for that ID No. or N is expressed as $(B+1)$ channel. For example, when ID No. or N is 100012, the priority radio channel to be assigned thereto is the channel 13 because B is 12 as produced from $100012 = 40 \times 2500 + 12$ and therefore $(B+1) = 13$.

Referring to FIG. 3, upon reception of a call, the fixed unit FU tunes the transmit and receive frequency to the priority radio channel which is assigned to the own station (step S1) and then determines whether that channel is idle, i.e., whether a received input electric field is present on that channel (step S2). If the priority radio channel is not idle, the program advances to a step S3 to search for an idle radio channel and, if any radio channel is idle, tunes the transmit and receive frequency to that channel (step S4). This is followed by a call reception flow which is well known in the art and therefore will not be described to avoid redundancy.

Referring to FIG. 4, the portable unit PU detects a request for the origination of a call when it becomes off-hook. The program begins with tuning the transmit and receive frequency to the priority radio channel which is assigned to the own station (step S11) and then sees if a calling signal with the own station's ID No. has arrived. If such a signal has arrived, the portable unit PU sends an answer signal including the ID No. to enter into a call reception flow. If the calling signal has not arrived, the program advances to a step S13 to see if the priority radio channel is idle. If it is idle, the portable unit PU sends a call origination signal including the ID No. to enter into a call origination flow. If the priority radio channel is not idle, a step S14 is executed to search for an idle channel and, if any channel is idle, the transmit and receive frequency is tuned to the idle channel (step S15). This is followed by a call origination flow. A call origination flow will not be described herein because it is also well known in the art.

How an idle channel is searched for and detected at the step S3 of the fixed unit FU and the step S14 of the portable unit PU will be described more specifically. To search for an idle channel, the units FU and PU each sees if the electric field level on the individual channels is lower than 20 dB for 1 micro V/m, the determination being continued for 100 ms for each channel. If the field level on any of the channels remains higher than the above threshold for a predetermined period of time, the unit FU or PU determines that that channel is busy and then checks the field level on the next channel upon the lapse of 30 ms. If the field level on the channel remains lower than the threshold for the predetermined period of time, the unit FU or PU decides that that channel is idle.

Figure 5:
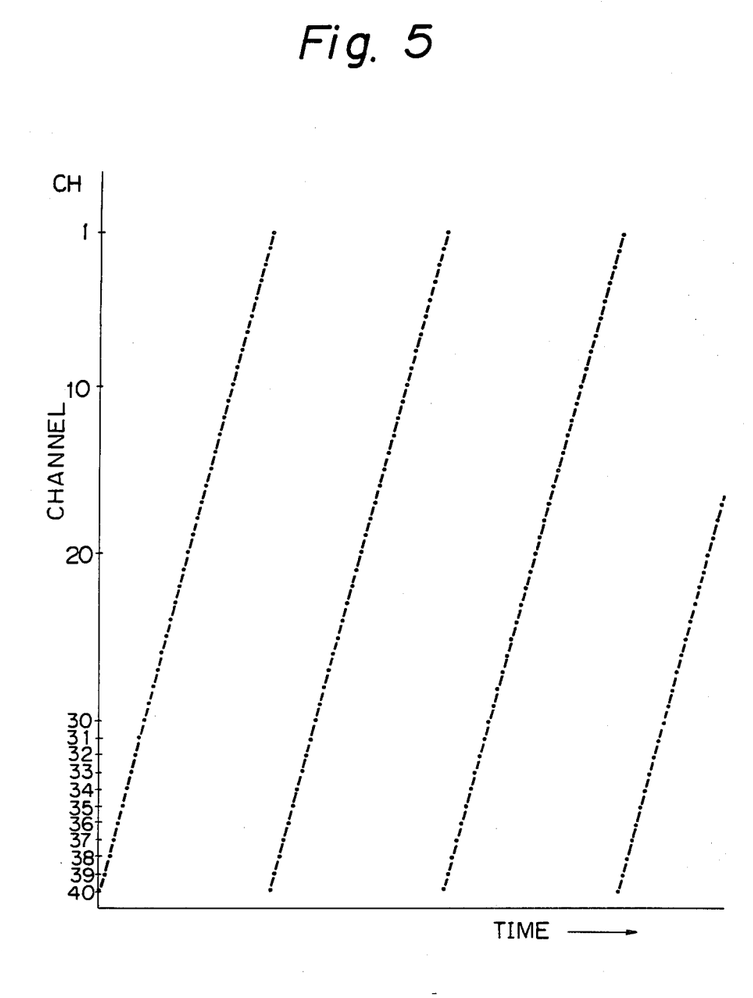
FIG. 5 is a chart representative of how the fixed unit searchs for a speech channel.

Speech channel search performed by the fixed unit FU is as follows. Assuming that forty radio channels are available, as shown in FIG. 5, the fixed unit FU sequentially scans channels 40 to 1 in this order and then returns to channel 40. If the field level on any of the channels is lower than 20 dB for 1, micro V/m, the unit FU checks the next channel. If it is higher than the above threshold, the unit FU searchs for a bit sync pattern over a predetermined period of time. If a bit sync pattern is not detected during that period of time, the unit FU switches to the search on the next channel for a communication channel. When a bit sync pattern has been detected, the unit FU continuously checks the data to the end. Then, at the instant when a matching ID code has been detected, the unit FU switches to the search on the next channel for a speech channel.

While the fixed unit FU performs a search in the waiting condition as described above, in the event of reception of a call the fixed unit FU enters into the call reception flow of FIG. 3 after returning to the priority channel such as channel 30.

Figure 6:
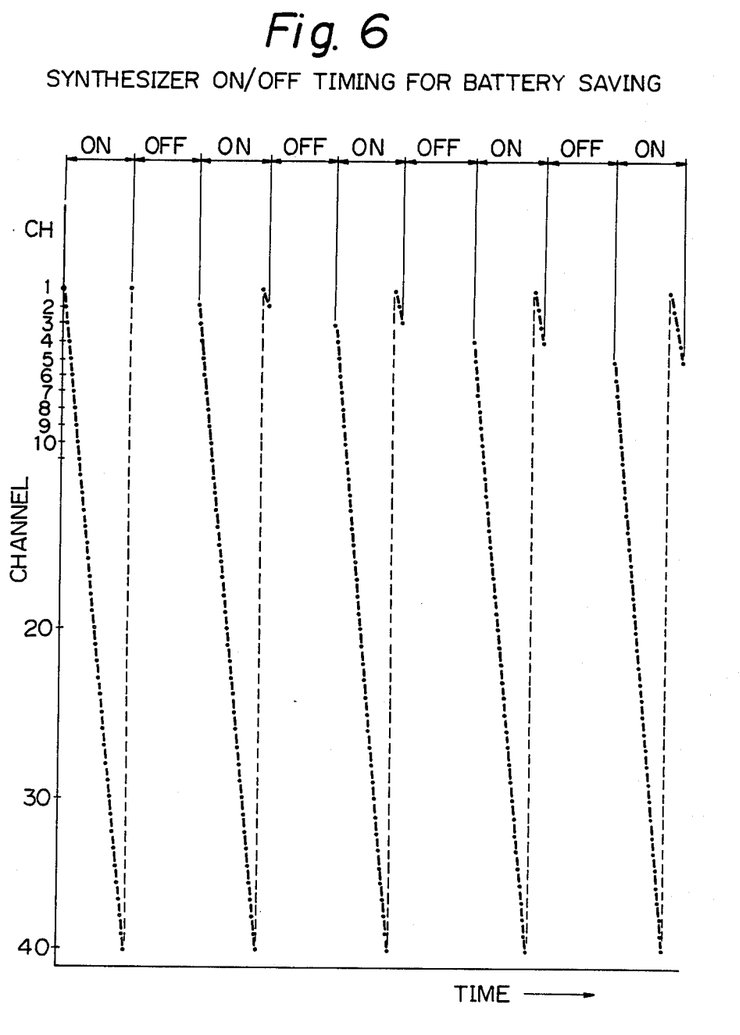
FIG. 6 is a chart showing how the portable unit searchs for a speech channel.

As regards the speech channel search performed by the portable unit PU, assume that forty radio channels are available as with the search at the fixed unit FU. As shown in FIG. 6, the unit PU sequentially scans channels 1 to 40 in this order and then returns to channel 1. The second scanning cycle begins with channel 2 and ends with channel 2, and the third scanning cycle begins with channel 3 and ends with channel 3. Such a scanning cycle is repeated thereafter. At the end of each scanning cycle, the unit PU deactivates the synthesizer 58 for battery saving purpose. The duration of such battery saving operation is also stored in the ID-ROM 56. A procedure which follows the channel switching is the same as the procedure which has been described in relation to the fixed unit FU.

While the portable unit PU performs a search in the waiting condition as described above, in the event of reception of a call the portable unit PU enters into the call reception flow of FIG. 4 after returning to the priority channel such as channel 30.

Figure 7:
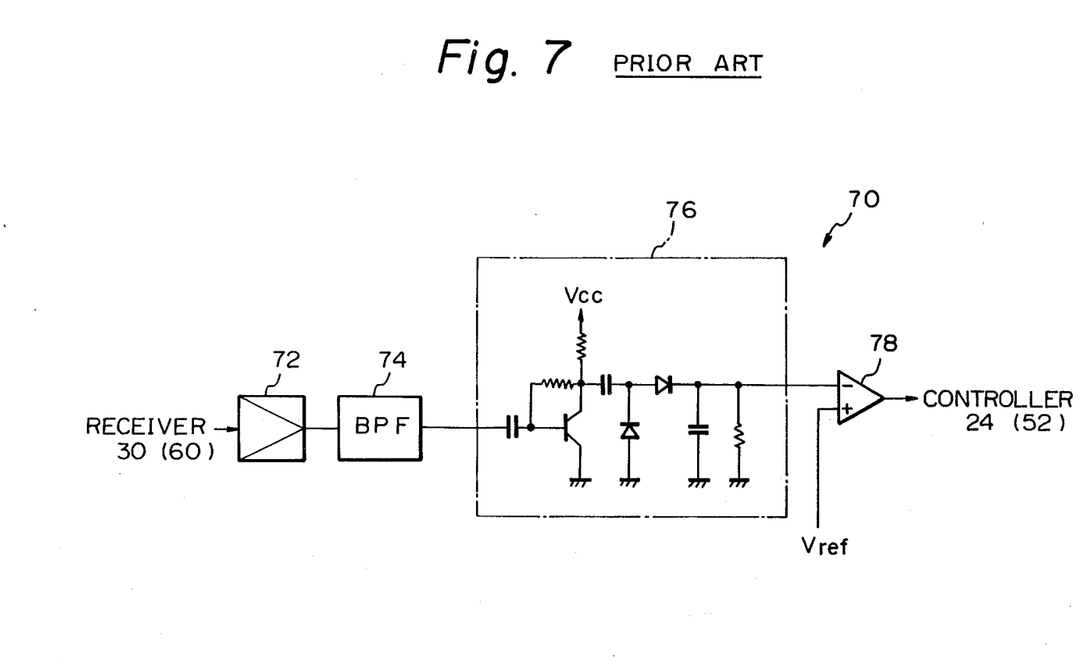
FIG. 7 is a block diagram schematically showing a specific construction of a circuit for sensing an idle channel.

Referring to FIG. 7, there is shown a specific construction of a ciruit for sensing an idle channel which is applicable to any of the fixed unit FU and portable unit PU of the present invention. The circuit, generally 70, is interposed between the receiver 30 of the fixed unit FU or the receiver 60 of the portable unit PU and the controller 24 or 52. The circuit 70 is made up of an amplifier 72 for amplifying an output of the receiver 30 or 60, a band-pass filter 74 for excluding noise outside the speech band from an output of the amplifier 72, a detector 76 for detecting an output of the band-pass filter 74, and a comparator 78 for comparing an output voltage of the detector 76 with a predetermined threshold value V ref and feeding its output to the controller 24 or 52. Since this kind of idle channel sensing circuit is well known in the art, a detailed description thereof will not be made herein.

In summary, it will be seen that a method of the present invention hardly allows a fixed unit and a portable unit of a cordless telephone to tune to different radio channels even when a request for the origination of a call occurs before a radio connection for an incoming call is completed. Hence, the method of the present invention eliminates the need for control channels otherwise used to minimize the occurrence that a radio connection for an incoming call is disabled due to the difference in radio channel. This unprecedented advantage is derived from selecting priority radio channels from those channels which are shared by independent cordless telephones and assigning them to the latter, causing each cordless telephone to use its priority radio channel so long as it is not occupied by another cordless telephone, and allowing the portable unit to enter into a call origination flow in response to a request only after confirming that an incoming calling signal is absent on the priority radio channel.

Various modifications will become possible for those skilled in the art after receiving the teachings of the present disclosure without departing from the scope thereof.

What is claimed is:

1. A method of connecting by radio a cordless telephone having a base unit and a mobile unit, having a particular identification number, and sharing a plurality of radio channels with other cordless telephones without using control channels, said method comprising the steps of:
    (a) selecting priority radio channels from the radio channels and assigning each of said priority radio channels to a respective one of the cordless telephones;
    (b) causing the base unit to monitor the priority radio channel assigned to the cordless telephone associated with said base unit when a calling signal is received;
    (c) if said priority radio channel is idle, causing said base unit to send the calling signal to the mobile unit over said priority radio channel;
    (d) causing said mobile unit to monitor the priority radio channel assigned to said cordless telephone when a call origination signal is to be sent;
    (e) causing said mobile unit to send an answer signal to said base unit when a calling signal meant for said cordless telephone is received over said priority radio channel; and
    (f) causing said mobile unit to send a call origination signal to said base unit over the priority radio channel only if a calling signal meant for said cordless telephone is not received over said priority radio channel and said priority radio channel is idle.

2. A method as claimed in claim 1, wherein the identification number is any of serial numbers which begin with zero, the step (a) comprising (g) dividing the identification number by a number of the radio channels and assigning one of the radio channels whose number corresponds to a residual to the cordless telephone having said identification number as the priority radio channel.

3. A method as claimed in claim 1, wherein the identification number is any of serial numbers which begin with one, the step (a) comprising (g) dividing the identification number by a number of the radio channels and assigning one of the radio channels whose number corresponds to a sum of a residual and one as the priority radio channel.

4. A method as claimed in claim 1, wherein the step (b) comprises (g) tuning a transmit and receive frequency to the priority radio channel assigned, and (h) determining whether a received input electric field is present.

5. A method as claimed in claim 1, further comprising (g) causing said base unit to, after said base unit has monitored the priority radio channel at the step (b) and if the priority radio channel is busy, search for any of the radio channels which is idle, and (h) when an idle channel is detected, causing said base unit to send the calling signal to said mobile unit over said idle channel.

6. A method as claimed in claim 5, wherein the step (g) comprises (i) determining whether an electric field level remains higher than a predetermined threshold for a predetermined period of time on a channel-by-channel basis, (j) when the electric field level on any of the channels remains higher than the threshold for the predetermined period of time, deciding that said channel is busy and, upon lapse of a predetermined period of time, shifts to another channel, and (k) when the electric field level on said channel is lower than the threshold, deciding that said channel is idle.

7. A method as claimed in claim 1, wherein the step (d) comprises (g) tuning a transmit and receive frequency to the priority radio channel assigned, and (h) determining whether a received input electric field is present on said priority radio channel.

8. A method as claimed in claim 1, further comprising (g) causing the mobile unit to, after said mobile unit has monitored the priority radio channel and if said priority radio channel is busy, search for one of the radio channels which is idle, and (h) when an idle channel is detected, causing said mobile unit to send the call origination signal to the base station over said idle channel.

9. A method as claimed in claim 8, wherein said step (g) comprises (i) determining whether an electric field level remains higher than a predetermined threshold for a predetermined period of time on a channel-by-channel basis, (j) when the electric field level on any of the channels remains higher than the threshold for the predetermined period of time, deciding that said channel is busy and, upon lapse of a predetermined period of time, shifts to another channel, and (k) when the electric field level on said channel is lower than the threshold, deciding that said channel is idle.

* * * * *